No. 725,910. PATENTED APR. 21, 1903.
L. F. ADT.
EYEGLASSES.
APPLICATION FILED DEC. 6, 1901.
NO MODEL.
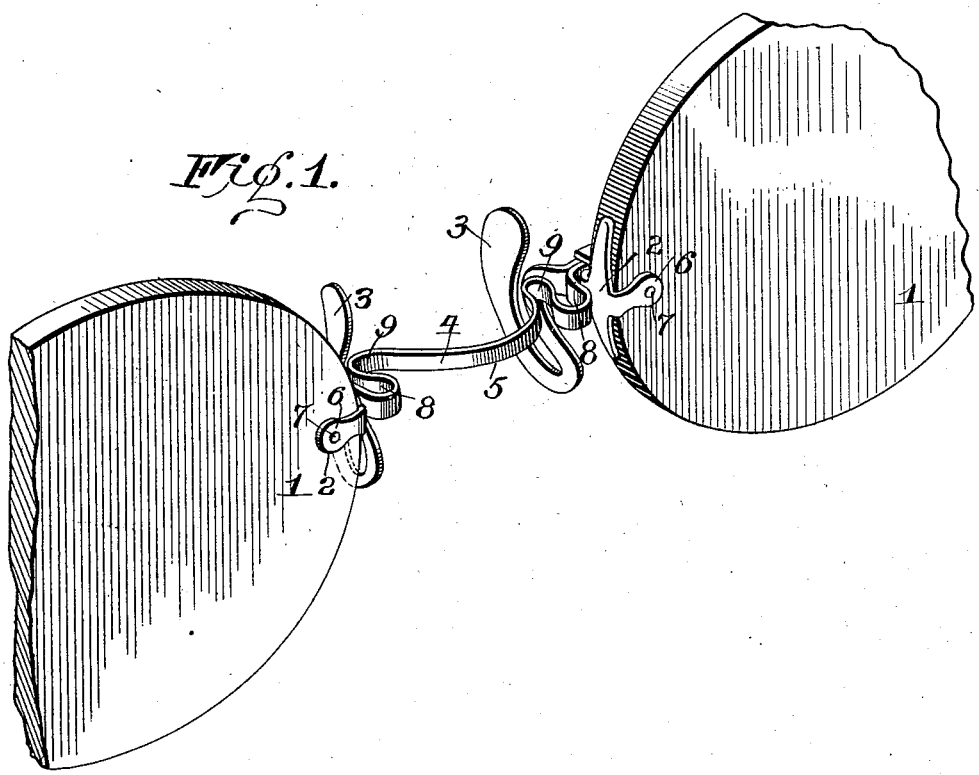
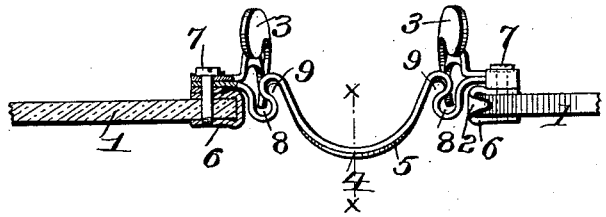
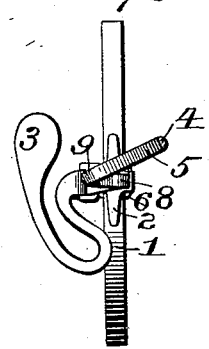
Witnesses.
Walter B. Payne.
Elizabeth J. Perry
Inventor.
Leo F. Adt
Frederick S. Church
His Attorney

UNITED STATES PATENT OFFICE.

LEO F. ADT, OF TROY, NEW YORK.

EYEGLASSES.

SPECIFICATION forming part of Letters Patent No. 725,910, dated April 21, 1903.

Application filed December 6, 1901. Serial No. 84,861. (No model.)

*To all whom it may concern:*

Be it known that I, LEO F. ADT, of Troy, in the county of Rensselaer, State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to eyeglasses or pince-nez, and has for its object to provide an improved spring-bridge or connection between the lenses that not only serves to hold the guards clamped upon the nose of the wearer, but which is capable of adjustment to adapt the bridge for noses of different shapes and also to vary the centers of the lenses to suit the pupilary distance of the wearer's eyes, either of these adjustments being accomplished without varying the other, so that the optician is not required to keep in stock a great variety of springs.

To this end the invention consists in the improvements hereinafter fully described, the novel features being pointed out in the claim at the end of the specification.

In the drawings, Figure 1 is a perspective view of a pair of eyeglasses provided with my improvements; Fig. 2, a sectional view of the same; Fig. 3, a cross-sectional view on the line *x x* of Fig. 2.

Similar reference-numerals in the several figures indicate similar parts.

I have shown my invention in connection with the so-called "rimless" eyeglasses, 1 indicating the lenses having at their inner proximate edges the holding-clips 2.

3 indicates the nose-guards, of the usual or any preferred construction, the ones shown being described and claimed in my pending application, Serial No. 82,656, filed November 18, 1901, and 4 indicates the spring-bridge forming the subject-matter of my present invention. This bridge is formed of a piece of flat spring metal having the arched portion 5, preferably adapted in use to contact with the wearer's nose and extending parallel with or at an angle to the axis of the lenses. The extreme ends of the bridge-spring are adapted to be secured rigidly to the lenses or lens-frames and in the present instance extend over the rear side of the lenses and beneath the shanks of the guards 3 and between the ears 6 of the clips 2, the clips, guards, lenses, and spring ends being secured by screws 7 passing through the parts, as shown in Fig. 2, or in any other suitable manner.

Between the arched or connecting portion 5 of the bridge-spring and the attaching ends said spring is bent or formed, preferably laterally of the edges, so as to present loops 8, open at or toward the front side, and loops 9, open at or toward the rear side, of the lenses, both loops being substantially horizontal or in a plane at an angle to that of the front of the lenses. These double loops or bends opening at both front and rear provide additional metal between the central part of the spring and the attaching ends, which enables the optician to adjust the central portion forwardly or backwardly toward or from the wearer's nose or to tilt said portion, if desired, without varying the distance between the centers of the lenses, or, if the central portion is properly fitted, this construction enables him to adjust the lenses toward or from each other to vary the pupilary distance without changing the shape of the bridge. The range of adjustment is increased by having the attaching ends of the spring extending substantially parallel with one face of the lenses, as it increases the depth of the outer loop without encroaching too much upon the space between the lenses; but it will be understood that instead of securing the parts to each other and to the lenses by single screws or rivets, as shown, the usual clips could be employed.

The particular construction of the nose-guards forms no part of my present invention, and other forms could be employed; but it is desirable that they extend rearwardly from the plane of the lenses more or less in order that they may coöperate with the spring to grip the nose, said spring usually engaging the front of the nose.

I claim as my invention—

In eyeglasses, the combination with the lenses and nose-guards connected thereto, of the spring of flat elastic material having the substantially horizontal forwardly and rearwardly extending open loops between its central portion and the attaching ends, said loops being formed by bending the flat spring material laterally of its edges.

LEO F. ADT.

Witnesses:
CHARLES S. ALDRICH,
LOUISE C. DILL.